(12) United States Patent
Shiraishi

(10) Patent No.: US 9,817,921 B2
(45) Date of Patent: Nov. 14, 2017

(54) INFORMATION PROCESSING APPARATUS AND CREATION METHOD FOR CREATING A PLAYLIST

(75) Inventor: Ayumi Shiraishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 594 days.

(21) Appl. No.: 13/429,001

(22) Filed: Mar. 23, 2012

(65) Prior Publication Data

US 2012/0250934 A1    Oct. 4, 2012

(30) Foreign Application Priority Data

Mar. 30, 2011    (JP) ................. 2011-075999

(51) Int. Cl.
*G06K 9/00* (2006.01)
*G06F 17/30* (2006.01)

(52) U.S. Cl.
CPC .. *G06F 17/30997* (2013.01); *G06F 17/30053* (2013.01); *G06F 17/30752* (2013.01)

(58) Field of Classification Search
None
See application file for complete search history.

(56) References Cited

U.S. PATENT DOCUMENTS

| | | | | |
|---|---|---|---|---|
| 5,832,474 A | * | 11/1998 | Lopresti et al. | |
| 5,889,506 A | * | 3/1999 | Lopresti et al. | ............. 345/158 |
| 6,311,189 B1 | * | 10/2001 | deVries et al. | |
| 6,484,156 B1 | * | 11/2002 | Gupta et al. | ................. 707/802 |
| 7,111,009 B1 | * | 9/2006 | Gupta et al. | ............... 369/30.08 |
| 7,954,049 B2 | * | 5/2011 | Fletcher et al. | ............. 715/231 |
| 8,380,671 B2 | * | 2/2013 | Albornoz et al. | ............ 707/639 |
| 8,566,329 B1 | * | 10/2013 | Freed et al. | ................. 707/748 |
| 8,769,589 B2 | * | 7/2014 | Amento et al. | ................ 725/86 |
| 2002/0045960 A1 | * | 4/2002 | Phillips et al. | ................ 700/94 |
| 2004/0181592 A1 | * | 9/2004 | Samra et al. | ................. 709/220 |
| 2005/0158028 A1 | * | 7/2005 | Koba | .................. G11B 27/034 386/243 |
| 2006/0015925 A1 | * | 1/2006 | Logan | ......................... 725/135 |
| 2006/0112335 A1 | * | 5/2006 | Hofmeister et al. | ......... 715/701 |
| 2006/0195403 A1 | * | 8/2006 | New et al. | ...................... 705/59 |
| 2006/0195479 A1 | * | 8/2006 | Spiegelman et al. | ...... 707/104.1 |
| 2006/0265421 A1 | * | 11/2006 | Ranasinghe et al. | ...... 707/104.1 |
| 2007/0024594 A1 | * | 2/2007 | Sakata et al. | ................. 345/173 |
| 2008/0065681 A1 | * | 3/2008 | Fontijn et al. | ................ 707/102 |
| 2008/0214214 A1 | * | 9/2008 | Reissmueller | ........ G06F 3/0486 455/466 |
| 2010/0085318 A1 | * | 4/2010 | Lee | ..................... G06F 3/04883 345/173 |
| 2010/0318908 A1 | * | 12/2010 | Neuman et al. | .... G06F 3/04815 715/716 |

(Continued)

FOREIGN PATENT DOCUMENTS

| | | |
|---|---|---|
| JP | 2004-117632 | 4/2004 |
| JP | 2006-268100 | 10/2006 |
| JP | 2010-129101 | 6/2010 |

*Primary Examiner* — Sean Conner
(74) *Attorney, Agent, or Firm* — Chip Law Group

(57) ABSTRACT

An information processing apparatus is disclosed which includes a control portion configured to allow a user to hand-draw and input a picture as a tag to be associated with user-designated contents so as to create a playlist of the contents based on degrees of similarity between the pictures associated with the contents as the tags thereof.

14 Claims, 16 Drawing Sheets

(56) References Cited

U.S. PATENT DOCUMENTS

| | | | |
|---|---|---|---|
| 2011/0175830 A1* | 7/2011 | Miyazawa | G06F 1/1643 345/173 |
| 2011/0218998 A1* | 9/2011 | Mercer et al. | 707/737 |
| 2011/0246937 A1* | 10/2011 | Roberts et al. | 715/810 |
| 2012/0102410 A1* | 4/2012 | Gewecke | G06F 17/30029 715/738 |
| 2012/0323917 A1* | 12/2012 | Mercer et al. | 707/737 |
| 2013/0166580 A1* | 6/2013 | Maharajh et al. | 707/758 |
| 2013/0174007 A1* | 7/2013 | Demarco et al. | 715/230 |

* cited by examiner

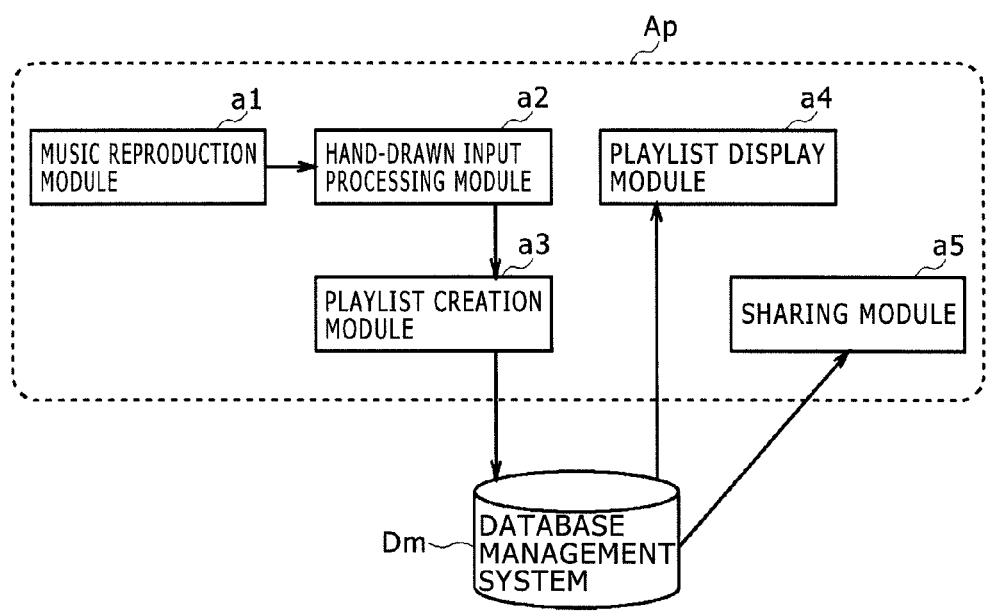

| HAND-DRAWN TAG ID | DEGREE OF SIMILARITY |
|---|---|
| 201082672691 | 8.10 |
| 201082717420 | 6.32 |
| 201082672546 | 4.07 |
| 201082643086 | 2.93 |
| 201082672810 | 2.45 |

FIG.12
| BASIC PICTURE | BASIC PICTURE NAME | ANIMATION |
|---|---|---|
|  | star | IT BLINKS |
|  | sun | IT SLOWLY BLINKS |
|  | cloud | IT RAINS |
|  | heart | IT EXPANDS AND CONTRACTS REPEATEDLY |

INFORMATION PROCESSING APPARATUS AND CREATION METHOD FOR CREATING A PLAYLIST

BACKGROUND

The present disclosure relates to an information processing apparatus, a playlist creation method, and a playlist creation program. More particularly, this disclosure relates to an information processing apparatus such as an apparatus for reproducing contents.

Recent years have seen the emergence of reproduction apparatuses that permit the creation of playlists each with a plurality of songs registered therein. When reproduction of a playlist is selected on the reproduction apparatus, the multiple songs registered in the selected playlist are reproduced in a predetermined sequence.

One such type of apparatus has been proposed to permit the creation of playlists based on impression values about songs such as intensity, uplifting feeling, exhilarating feeling, simplicity, and softness (e.g., see Japanese Patent Laid-Open No. 2004-117632).

Another such type of apparatus has been proposed to permit the creation of playlists based on the descriptions of songs, scenes evoked by songs, and situations in which songs are to be listened to, for example (e.g., see Japanese Patent Laid-Open No. 2006-268100).

Yet another such type of apparatus has been proposed to permit the creation of playlists based on the volume level set at the time of reproducing songs (e.g., see Japanese Patent Laid-Open 2010-129101).

SUMMARY

The above-cited apparatuses allow playlists to be created on the basis of predetermined indices such as the impression values. However, since the images of songs vary from one user to another, some users may wish to create playlists based on indices different from those determined beforehand.

Thus the above-cited apparatuses have yet to fully satisfy the need of individual users wishing to create playlists as desired.

The present disclosure has been made in view of the above circumstances and provides an information processing apparatus, a playlist creation method, and a playlist creation program for creating playlists that suit individual users' desires.

According to one embodiment of the present disclosure, there is provided an information processing apparatus including a control portion configured to allow a user to hand-draw and input a picture as a tag to be associated with user-designated contents so as to create a playlist of the contents based on degrees of similarity between the pictures associated with the contents as the tags thereof.

Because the user is allowed to hand-draw and input a picture as a tag to be associated with contents, it is possible for the user to come up with a freely expressed image as the tag of the contents. And when a playlist of contents is created based on the degrees of similarity between the pictures associated as tags with the contents, it is possible to create, for example, a playlist of the contents furnished with the images which have been expressed by the user and which are similar therebetween. In this manner, playlists can be created on the basis of the tags expressive of desired images freely conceived by individual users.

The present disclosure thus provides an information processing apparatus, a playlist creation method, and a playlist creation program allowing the user to hand-draw and input a picture as a tag to be associated with contents; it is possible for the user to come up with a freely expressed image as the tag of the contents. With playlists of contents created based on the degrees of similarity between the pictures associated as tags with the contents, it is possible to create, for example, a playlist of the contents furnished with the images which have been expressed by the user and which are similar therebetween. In this manner, the disclosed information processing apparatus, playlist creation method, and playlist creation program permit playlists to be created on the basis of the tags expressive of desired images freely conceived by individual users.

BRIEF DESCRIPTION OF THE DRAWINGS

Further advantages of the present disclosure will become apparent upon a reading of the following description and appended drawings in which:

FIG. 5 is a schematic view explanatory of how the music reproduction application is structured;

FIG. 6 is a tabular view explanatory of how a playlist management table is structured;

FIG. 12 is a schematic view explanatory of the relations of correspondence between basic pictures and animations;

DETAILED DESCRIPTION OF THE PREFERRED EMBODIMENTS

Some preferred embodiments (called the embodiment hereunder) of the present disclosure will now be described. The description will be given under the following headings:

1. Outline of the embodiment;
2. Specific examples of the embodiment; and
3. Variations.

1. Outline of the Embodiment

An outline of the embodiment is explained first. The explanation of the outline is followed by explanations of specific examples of the embodiment, before explanations are given lastly of variations of the embodiment. The outline to be explained here embraces the specific examples and variations of the embodiment.

Figure 1:
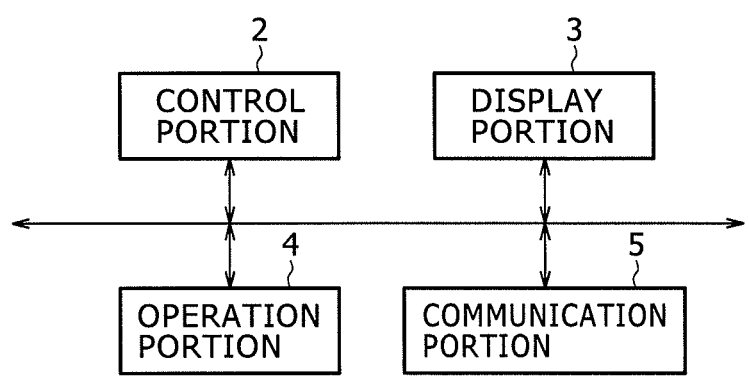
FIG. 1 is a block diagram showing a functional structure of an information processing apparatus outlining an embodiment of the present disclosure.

In FIG. 1, reference numeral 1 denotes an information processing apparatus. The information processing apparatus 1 includes a control portion 2 that allows a user to hand-draw and input a picture as a tag to be associated with user-designated contents so as to create a playlist of the contents based on degrees of similarity between the pictures associated with the contents as the tags thereof.

When the user is allowed to hand-draw and input a picture as a tag to be associated with contents, the user can come up with a freely expressed image as the tag of the contents. When a playlist of contents is created based on the degrees of similarity between the pictures associated as the tags with the contents, it is possible to create, for example, a playlist of the contents furnished with the images which have been expressed by the user and which are similar therebetween. In this manner, the information processing apparatus 1 allows playlists to be created on the basis of the tags expressive of desired images freely conceived by individual users. The playlists are thus created in such a manner as to satisfy the individual users' desires.

Specifically, the control portion 2 may determine whether the pictures associated as the tags with the contents are similar therebetween based on the degrees of similarity so as to register in the same playlist the contents having the pictures determined to be similar therebetween as the tags.

Also, the control portion 2 may select for each playlist one of the pictures associated as the tags with the contents registered in the playlists so as to permit a display portion 3 to display a table of the pictures selected per playlist.

In that case, when permitting the display portion 3 to display the table, the control portion 2 may set a display mode for the picture selected per playlist on the basis of related information about the playlist of interest.

Specifically, based on the number of songs registered per playlist, the control portion 2 may set a display size for the picture selected for each playlist.

Also specifically, the control portion 2 may display the picture selected per playlist using an animation based on a description indicated by the picture selected for the playlist of interest.

Also, if the user designates a plurality of pictures from those each selected per playlist while the display portion 3 is being caused to display the table, the control portion 2 may create a playlist combining a plurality of playlists corresponding to the designated plurality of pictures.

Also, while reproducing a given content, the control portion 2 may receive the hand-drawn input of the picture via an operation portion 4 and associate the hand-drawn input picture as the tag with the content being reproduced.

Also, while displaying related information about a given content on The display portion 3, the control portion 2 may receive the hand-drawn input of the picture via the operation portion 4 and associate the hand-drawn input picture as the tag with the content of which the related information is being displayed.

Also, the control portion 2 may transmit the created playlist together with the picture associated as the tag with the contents registered in the playlist in question to an external apparatus via a communication portion 5.

Also, when the picture is hand-drawn and input by the user as a search key, the control portion 2 may search the pictures associated as the tags with the contents for a picture similar to the picture as the search key based on the degrees of similarity between the associated pictures on the one hand and the picture as the search key on the other hand. The control portion 2 may then select a playlist in which the contents having the searched-for picture associated therewith as the tag are registered.

Specific examples of the information processing apparatus 1 structured as outlined above are explained below in detail.

2. Specific Examples of the Embodiment

[2-1. External Structure of the Portable Terminal]

Figure 2A:
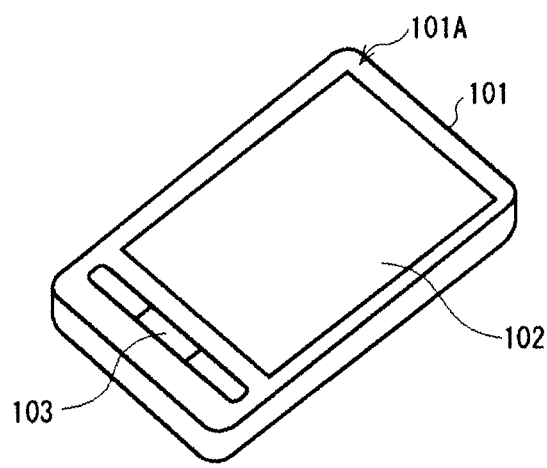
FIGS. 2A and 2B are schematic views showing an external structure of a portable terminal.

Specific examples of the embodiment above are explained next. First, the external structure of a portable terminal 100 as one such specific example of the above-described information processing apparatus 1 is explained below using FIG. 2A.

The portable terminal 100 has an enclosure 101 that is approximately flat and rectangular in shape and large enough to be held by one hand.

At the center of a front face 101A of the enclosure 101 is a rectangular touch screen 102. The touch screen 102 is made up of an LCD (liquid crystal display) panel and a thin, transparent touch panel covering the display surface of the LCD panel. For example, the touch panel may be a capacitance type touch panel.

The portable terminal 100 is designed to receive touch operations made on the touch screen 102 with fingertips (or with a stylus or the like supporting capacitance operations) as the input of operations by the user.

Figure 2B:
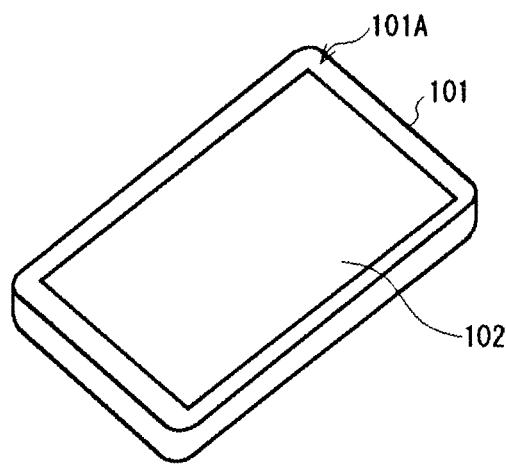

Furthermore, operation buttons 103 are located near the touch screen 102 on the front face 101A of the enclosure 101 of the portable terminal 100. Alternatively, as shown in FIG. 2B, the present disclosure may be applied to a portable terminal 100X furnished with a touch screen 102 covering an entire front face 101A of an enclosure 101 with no operation buttons 103 attached.

Also, the portable terminal 100 is designed to be usable with the rectangular touch screen 102 vertically oriented (i.e., in the portrait position) or horizontally oriented (in the landscape position).

[2-2. Hardware Structure of the Portable Terminal]

Figure 3:
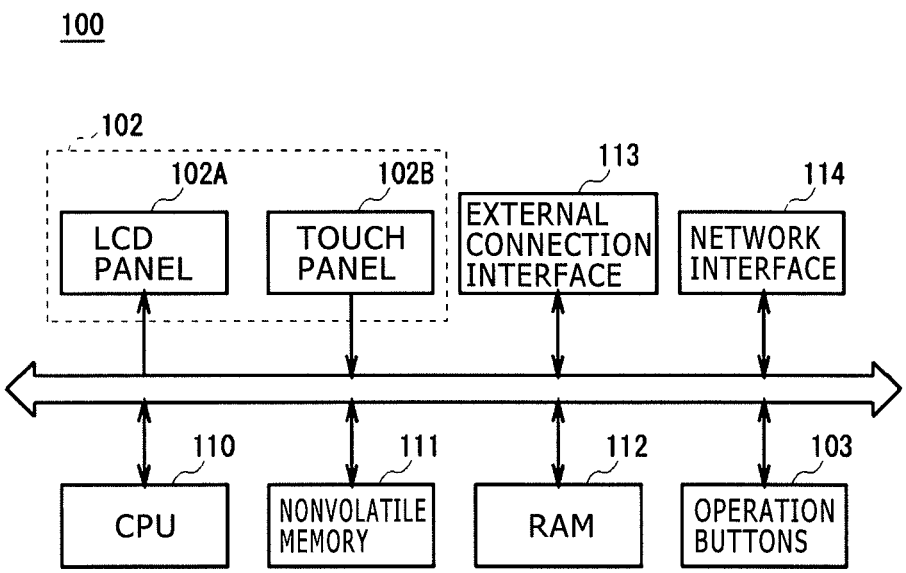
FIG. 3 is a block diagram showing a hardware structure of the portable terminal.

The hardware structure of the portable terminal 100 is explained next with reference to FIG. 3. In the portable terminal 100, a CPU (central processing unit) 110 extracts programs from a nonvolatile memory 111 and loads them into a RAM (random access memory) 112 to carry out diverse processes and control various components in accordance with the loaded programs.

The touch screen 102 is constituted by an LCD panel 102A as a display device for displaying diverse information and by a touch panel 102B as an operation input device for receiving the input of operations.

The touch panel 102B includes a plurality of electrostatic sensors (not shown) arrayed in a grid-like pattern relative to an operation surface. When a conductor such as a finger approaches the operation surface, these electrostatic sensors change in capacitance and output varying values accordingly.

The touch panel 102B sends the varying output values of the electrostatic sensors and their positions to the CPU 110.

Based on the data thus received, the CPU 110 identifies the area touched by the fingertip (called the touched area) on the operation surface of the touch panel 102B (i.e., on the screen of the LCD panel 102A).

Then the CPU 110 recognizes the gravity point or the center of the touched area (i.e., gravity point or center of the fingertip touching the operation surface) as the touched position on the screen.

The CPU 110 also acquires from the touch panel 102B the output value and position of each electrostatic sensor at predetermined intervals and, upon sensing the touched position from the touched area, detects a displacement of the touched position.

Based on the detected displacement, the CPU 110 recognizes the movement of the touched position on the screen (i.e., locus of the touched position).

Based on the touched position and its locus thus recognized, the CPU 110 determines what kind of touch operation has been performed on the screen, receives the touch operation as the operation input, and carries out processing in accordance with the received operation input.

Incidentally, the CPU 110 is designed to receive as its operation input such touch operations as a touch (i.e., contact), a press and hold (pressing a given screen area down for at least a predetermined time period), a tap (touching a screen area and immediately detaching therefrom), a double tap (a tap made twice consecutively), a drag (tracing the screen with a finger), and a flick (flicking away a screen area).

Also, the portable terminal 100 supports what may be called multi-touch operations (involving a plurality of fingers performing touch operations simultaneously).

In practice, if there exist a plurality of touched areas, the CPU 110 senses the touched position from each of these touched areas. Based on the plurality of touched positions and on their loci, the CPU 110 identifies what kind of multi-touch operation has been performed on the screen, receives the identified multi-touch operation as the operation input, and carries out processing in accordance with the identified operation input.

Incidentally, the CPU 110 receives as the operation input such multi-touch operations as pinch-in (narrowing the space between two fingertips touching the screen) and pinch-out (widening the space between two fingertips touching the screen).

Also, upon recognizing a press operation on the operation buttons 103, the CPU 110 receives the recognized operation as the operation input and performs processing accordingly.

Furthermore, the CPU 110 may exchange diverse data with an external device connected by cable for communication therewith via an external connection interface 113.

In addition, the CPU 110 may exchange various data with an external device connected by network for communication therewith via a network interface 114.

Suppose now that during display on the touch screen 102 of a table of thumbnails representing the pictures stored as picture files in the nonvolatile memory 111, the user has double-tapped a desired thumbnail.

In that case, the CPU 110 receives the touch operation as the input of the operation for reproducing a picture. The CPU 110 thus retrieves the picture file corresponding to the double-tapped thumbnail from the nonvolatile memory 111.

If the corresponding picture file is a still picture file, the CPU 110 extracts still picture data from that still picture file. The CPU 110 then performs predetermined reproduction processes such as decoding and digital-to-analog conversion on the still picture data to acquire a still picture signal for display of a still picture on the LCD panel 102A of the touch screen 102.

On the other hand, if the corresponding picture file is an animated picture file, the CPU 110 separates animated picture data and audio data from the animated picture file. The CPU 110 then performs predetermined reproduction processes such as decoding and digital-to-analog conversion on the animated picture data to acquire an animated picture signal for display of an animated picture on the LCD panel 102A of the touch screen 102. The CPU 110 further carries out such predetermined reproduction processes as decoding, digital-to-analog conversion, and amplification on the audio data to acquire an audio signal for audio output through a headphone terminal (not shown).

In this manner, the portable terminal 100 reproduces the picture designated by the user.

Suppose also that during display on the touch screen 102 of a table of thumbnails of the jacket photos stored as music files in the nonvolatile memory 111, the user has double-tapped a desired thumbnail.

In that case, the CPU 110 receives the touch operation as the input of the operation for reproducing a song. The CPU 110 thus retrieves from the nonvolatile memory 111 the music file corresponding to the double-tapped thumbnail.

The CPU 110 extracts audio data from the retrieved music file. The CPU 110 proceeds to perform such reproduction processes as decoding, digital-to-analog conversion, and amplification on the audio data to acquire an audio signal for audio output through the headphone terminal (not shown).

In this manner, the portable terminal 100 reproduces the song designated by the user.

At that point, the CPU 110 acquires related information such as a jacket photo, a song title, an album title, and the artist's name from the retrieved music file, and displays the acquired information on the LCD panel 102A of the touch screen 102.

In this manner, the portable terminal 100 reproduces the song designated by the user while displaying the information related to the song.

Incidentally, the CPU 110 of the portable terminal 100 is a specific hardware example of the control portion 2 of the information processing apparatus 1 explained above in the outline of the embodiment. The LCD panel 102A of the portable terminal 100 is a specific hardware example of the display portion 3 of the information processing apparatus 1. Also, the above-described touch panel 102B of the portable terminal 100 is a specific hardware example of the operation portion 4 of the information processing apparatus 1. Furthermore, the external connection interface 113 or network interface 114 of the portable terminal 100 is a specific hardware example of the communication portion 5 of the information processing apparatus 1.

[2-3. Music Reproduction Application]

[2-3-1. Outline of the Music Reproduction Application]

The portable terminal 100 is designed to have various application programs (or simply called applications) installed therein. One such installed application is devised to reproduce music (the application is called the music reproduction application hereunder).

Figure 4:
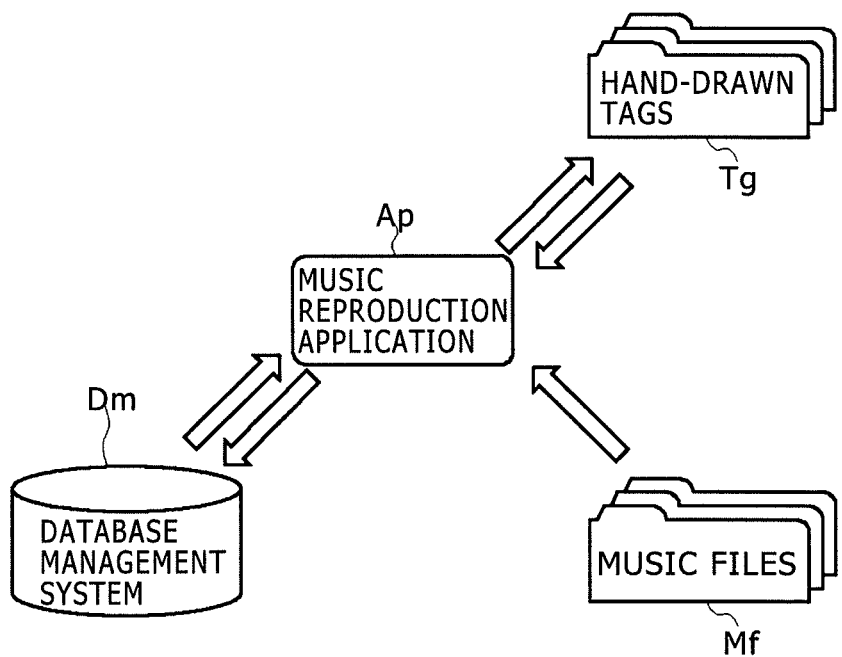
FIG. 4 is a schematic view explanatory of data related to a music reproduction application.

As shown in FIG. 4, the music reproduction application Ap can reproduce songs stored in the form of music files Mf in the nonvolatile memory 111. The nonvolatile memory 111 can accommodate a plurality of music files Mf.

Also, the music reproduction application Ap can associate a picture that is hand-drawn and input by the user via the touch screen 102 with a song as its tag. In the ensuing description, a hand-drawn input picture associated with a song as its tag will be referred to as a hand-drawn tag Tg. The nonvolatile memory 111 can accommodate a plurality of hand-drawn tags Tg.

Furthermore, the music reproduction application Ap can create playlists of songs based on the hand-drawn tags Tg. Specifically, the music reproduction application Ap may create playlists by registering the songs with mutually similar hand-drawn tags Tg in the same playlist.

The playlists created by the music reproduction application Ap are stored into the nonvolatile memory 111 and managed by a database management system Dm.

As shown in FIG. 5, the music reproduction application Ap is made up of a music reproduction module a1, a hand-drawn input processing module a2, a playlist creation module a3, a playlist display module a4, and a sharing module a5.

The CPU 110 performs processes for controlling the reproduction of music through the use of the music reproduction module a1.

Also, the CPU 110 performs processes (to be discussed later in detail) for inputting hand-drawn tags Tg in accordance with the user's touch operations through the use of the hand-drawn input processing module a2.

Also, the CPU 110 performs processes (to be discussed later in detail) for creating playlists based on the hand-drawn tags Tg through the use of the playlist creation module a3. The playlists created here are managed by the database management system Dm as mentioned above.

Furthermore, through the use of the playlist display module a4, the CPU 110 performs processes (to be discussed later in detail) for displaying the playlists managed by the database management system Dm.

In addition, through the use of the sharing module a5, the CPU 110 performs processes (to be discussed later in detail) for creating a shared file for sharing playlists managed by the database management system Dm with an external device and for transmitting the created shared file to that external device.

[2-3-2. Management of the Playlists]

Explained below with reference to FIG. 6 is how the playlists are managed on the portable terminal 100. The playlists created by the music reproduction application Ap are managed in a playlist management table TB held by the database management system Dm.

In the playlist management table TB, each hand-drawn tag Tg is stored in association with a hand-drawn tag ID 151 identifying the hand-drawn tag Tg, a hand-drawn tag color information 152 indicating the color of the lines making up the hand-drawn tag Tg, a song ID 153 identifying the song to which the hand-drawn tag Tg is related, and a playlist ID 154 identifying the playlist corresponding to the hand-drawn tag Tg. The playlist corresponding to given hand-drawn tags Tg refers to a playlist of the songs associated with these hand-drawn tags Tg.

For example, in FIG. 6, a song having the song ID "1" associated with a hand-drawn tag Tg identified by the hand-drawn tag ID "201082672691" is registered in a playlist identified by the playlist ID "201082672691."

Also in FIG. 6, a song having the song ID "2" associated with a hand-drawn tag Tg identified by the hand-drawn tag ID "201082815235" is registered in a playlist identified by the playlist ID "201082672691."

The example above signifies that because the hand-drawn tag Tg associated with the hand-drawn tag ID "201082672691" is similar to the hand-drawn tag Tg with the hand-drawn tag ID "201082815235," the song having the song ID "1" and the song having the song ID "2" are registered in the playlist identified by the same playlist ID "201082672691."

In the playlist management table TB, as described above, a given playlist is associated with a plurality of mutually similar hand-drawn tags Tg. The multiple songs associated with these hand-drawn tags Tg are registered in that playlist.

Each playlist is set with the hand-drawn tag representative thereof (which may be called the representative hand-drawn tag hereunder). One of the hand-drawn tags Tg associated with each playlist is selected as the representative hand-drawn tag.

The playlist ID 154 is set to be the same as the hand-drawn tag ID 151 of the representative hand-drawn tag. Thus the representative hand-drawn tag can be identified by the playlist ID 154.

For example, the representative hand-drawn tag of the playlist having the playlist ID "201082672691" in FIG. 6 is the hand-drawn tag having the hand-drawn tag ID "201082672691" that is identical to the playlist ID "201082672691."

[2-3-3. Creation of the Playlist]

Figure 7A:
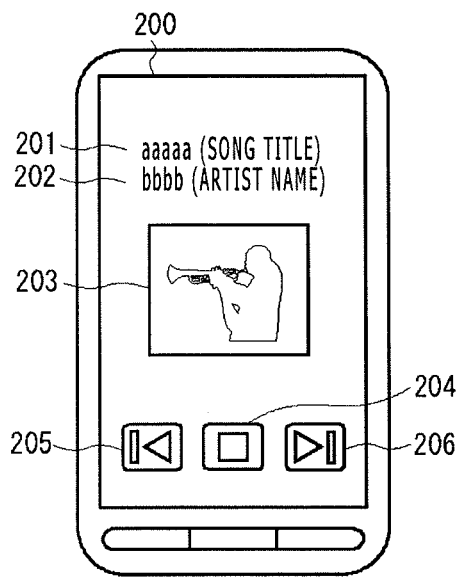
FIGS. 7A, 7B, 7C and 7D are schematic views explanatory of a music reproduction screen and a hand-drawn input screen.

Explained below in detail is the process of creating a playlist based on hand-drawn tags Tg. Upon receipt of the input of operations for reproducing a song through the touch screen 102, the CPU 110 reproduces the designated song and causes the touch screen 102 to display a music reproduction screen 200 at the same time as shown in FIG. 7A.

Incidentally, the music reproduction screen 200 shown in FIGS. 7A through 7D is as it appears when the portable terminal 100 is used in the portrait position. The screen 200 is displayed as a vertically elongated screen over the entire touch screen 102 in the portrait position.

The music reproduction screen 200 displays a song title 201, an artist name 202, and a jacket photo 203 as related information about the designated song. Also, the music reproduction screen 200 displays a stop button 204, a fast-rewind button 205, and a fast-forward button 206.

When the user taps the fast-rewind button 205, the CPU 110 reproduces the immediately preceding song in a predetermined reproduction sequence and causes the music reproduction screen 200 to display related information about that song at the same time. When the user taps the fast-forward button 206, the CPU 110 reproduces the immediately following song in the predetermined reproduction sequence and causes the music reproduction screen 200 to display related information about that song at the same time.

Figure 7B:
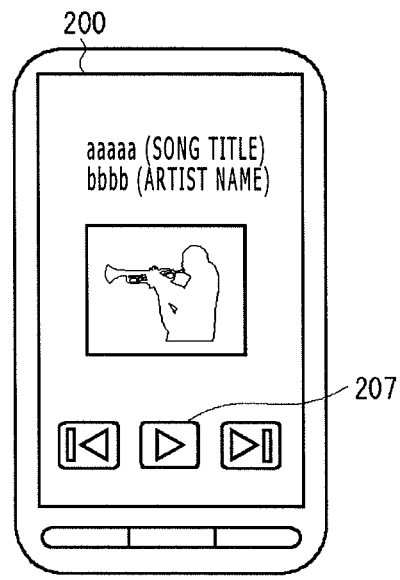

When the user taps the stop button 204, the CPU 110 stops reproduction of the song and, with the music reproduction screen 200 kept displayed as shown in FIG. 7B, and changes the display of the stop button 204 to a play button 207. When the user taps the play button 207, the CPU 110 restarts reproduction of the song corresponding to the related information displayed on the music reproduction screen 200.

Figure 7C:
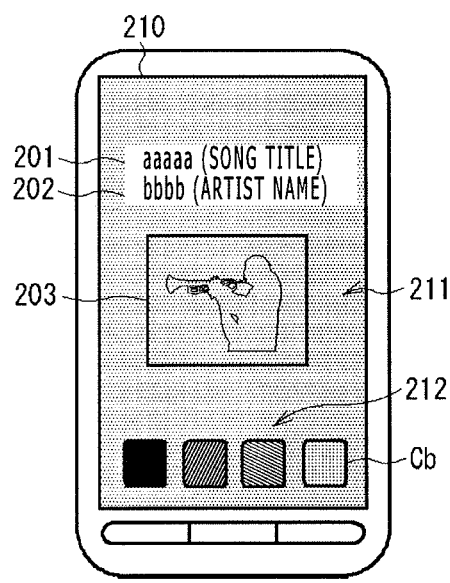

Also, upon receipt of the input of operations for starting the input of a hand-drawn tag Tg while the music reproduction screen 200 is kept displayed (i.e., while the designated song is being reproduced or stopped), the CPU 110 displays a hand-drawn input screen 210 shown in FIG. 7C.

The hand-drawn input screen 210 is a grey, translucent screen that appears overlaid on the music reproduction screen 200. Thus the hand-drawn input screen 210 allows what is displayed on the music reproduction screen 200 (i.e., related information about the song such as the song title 201 and jacket photo 203) below to be seen through.

The hand-drawn input screen 210 is made up of a canvass area 211 where lines can be drawn as desired and a color palette 212 for designating the color of the lines. The color palette 212 is composed of a plurality of color boxes Cb representative of different colors.

On the hand-drawn input screen 210, the user can select a line color from the color palette 212 and then draw lines by tracing them through drag operations inside the canvass area 211.

When the user taps a color box Cb, the CPU 110 establishes the color corresponding to the tapped color box Cb as the line color.

Figure 7D:
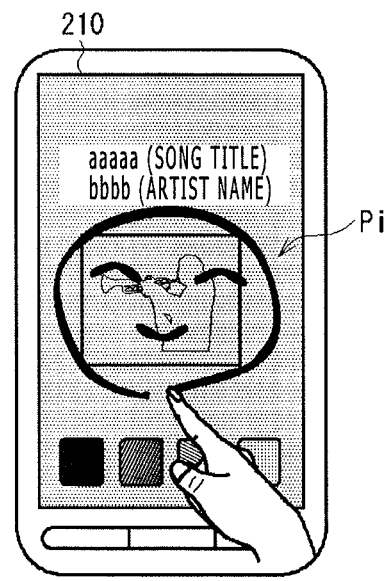

When the user later performs drag operations, the CPU 110 displays a hand-drawn picture Pi using lines in the currently selected color along the locus of the drag operations inside a canvas area 202A, as shown in FIG. 7D.

The portable terminal 100 receives the input of a hand-drawn picture Pi as explained above while displaying related information about a given song. The user is thus allowed to input the hand-drawn picture Pi while verifying the related information about the song of interest.

Also, the portable terminal 100 receives the input of the hand-drawn picture Pi while reproducing a given song. This allows the user to input the hand-drawn picture Pi while listening to the song of interest.

Later, upon receipt of the input of operations for associating a given song with a tag, the CPU 110 associates the user-designated song (i.e., about which the related information is currently displayed) with the currently displayed hand-drawn picture Pi as a hand-drawn tag Tg.

Specifically, the CPU 110 attaches a unique hand-drawn tag ID to the hand-drawn tag Tg, establishes the hand-drawn tag ID as the file name of the hand-drawn tag Tg, and stores the hand-drawn tag Tg into the nonvolatile memory 111.

At the same time, the CPU 110 stores the hand-drawn tag ID and hand-drawn tag color information about the hand-drawn tag Tg in the playlist management table TB in association with the song ID of the song designated by the user.

The processes above allow the portable terminal 100 to associate the user-designated song with the hand-drawn tag Tg.

While associating the designated song with the hand-drawn tag Tg as explained above, the CPU 110 also selects a playlist in which to register the designated song based on the associated hand-drawn tag Tg.

First, the CPU 110 searches the representative hand-drawn tags of the playlists registered in the playlist management table TB for a representative hand-drawn tag similar to the input hand-drawn tag Tg.

Specifically, the CPU 110 calculates the degree of similarity between the representative hand-drawn tag of each playlist and the input hand-drawn tag Tg. While there exist diverse methods for calculating the degree of such similarity, what is adopted here as an example is the method of calculating the degree of similarity based on the stroke order of the hand-drawn tag Tg.

Figure 8A:
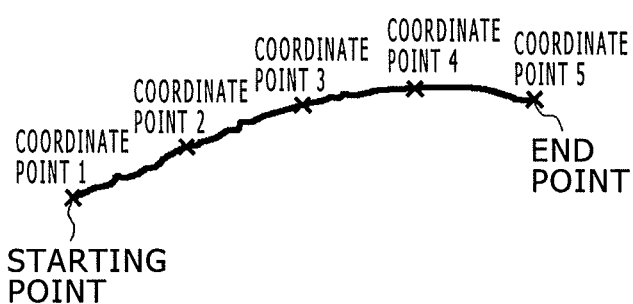
FIGS. 8A, 8B, 8C, 8D and 8E are schematic views explanatory of how to calculate degrees of similarity between input hand-drawn tags.
Figure 8B:
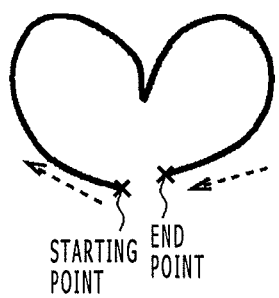
Figure 8C:
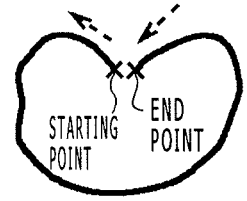
Figure 8D:
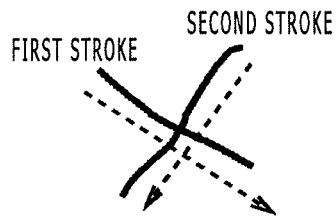
Figure 8E:
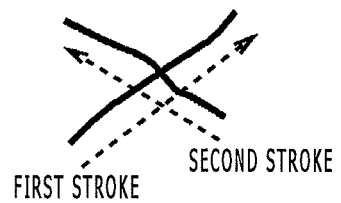

As shown in FIG. 8A, this method involves chronologically detecting the locus of the touched position from a starting point where a finger touches the touch screen 102 to an end point where the fingertip is detached from the touch screen 102. The chronological order of the locus of the touched position from the starting point to the end point is recognized as one stroke. Thus the hand-drawn tag Tg is recognized as composed of one or a plurality of strokes. For example, the hand-drawn tags shown in FIGS. 8B and 8C are each regarded as composed of one stroke, and the hand-drawn tags Tg shown in FIGS. 8D and 8E are each considered to be made up of two strokes.

According to this method, the greater the similarity between the strokes of the input hand-drawn tag Tg on the one hand and the strokes of the representative hand-drawn tag being compared on the other hand, the higher the degree of similarity calculated between the input hand-drawn tag Tg and the representative hand-drawn tag for the comparison. With this method, the degree of similarity is calculated to be low between hand-drawn tags Tg with different strokes, such as those shown in FIGS. 8B and 8C. The degree of similarity is likewise calculated to be low between the hand-drawn tags Tg with different strokes shown in FIGS. 8D and 8E.

Information about the strokes of a hand-drawn tag Tg is attached to the data about the tag Tg in question when, for example, that tag Tg is input and stored into the nonvolatile memory 111.

In this case, there is no consideration for the color of the lines with regard to the degree of similarity between the input hand-drawn tag Tg and the representative hand-drawn tag being compared. Only the degree of similarity between shapes is calculated.

Figure 9A:
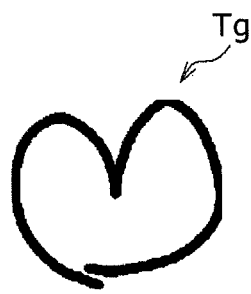
FIGS. 9A and 9B are schematic views explanatory of a list of the degrees of similarity between input hand-drawn tags.
Figure 9B:

As explained above, the CPU 110 calculates the degree of similarity between the representative hand-drawn tag of each playlist and the input hand-drawn tag Tg, so as to create a list of the hand-drawn tag IDs of the representative hand-drawn pictures in descending order of the degree of similarity. For example, if the input hand-drawn tag Tg is what is shown in FIG. 9A, a list indicated in FIG. 9B is created. In FIG. 9B, a corresponding hand-drawn tag Tg is shown on the left side of each hand-drawn tag ID for purpose of explanation. In this list, the larger the number, the higher the degree of similarity calculated.

Based on the list thus created, the CPU 110 extracts the representative hand-drawn tags that have the degrees of similarity equal to or higher than a predetermined threshold value. That the degree of similarity of a given representative hand-drawn tag is equal to or higher than the predetermined threshold value signifies that the hand-drawn tag Tg of interest is similar in shape to the representative hand-drawn tag in question.

From the representative hand-drawn tags extracted above, the CPU 110 further extracts those having the same line color as that of the input hand-drawn tag Tg. Of the representative hand-drawn tags extracted here, the one having the highest degree of similarity is determined by the CPU 110 to be similar to the input hand-drawn tag Tg.

When the representative hand-drawn tag similar to the input hand-drawn tag Tg is retrieved as explained above, the CPU 110 selects the playlist corresponding to the retrieved representative hand-drawn tag as the playlist in which to register the song designated by the user.

The CPU 110 then stores into the playlist management table TB the playlist ID of the selected playlist in association with the hand-drawn tag ID and hand-drawn tag color information about the input hand-drawn tag Tg as well as the song ID of the user-designated song.

In the manner described above, the CPU 110 adds the user-designated song to the existing playlist corresponding to the representative hand-drawn tag similar to the hand-drawn tag Tg input by the user.

Consequently, the songs with their hand-drawn tags Tg similar therebetween are registered one after another into the same playlist. This creates a playlist containing the songs with their hand-drawn tags Tg similar to one another.

On the other hand, if no representative hand-drawn tag similar to the input hand-drawn tag Tg is retrieved from the representative hand-drawn tags registered in the playlist management table TB, the CPU 110 creates a new playlist corresponding to the input hand-drawn tag Tg.

Specifically, the CPU 110 establishes the hand-drawn tag ID of the input hand-drawn tag Tg as the playlist ID of the new playlist. That is, the CPU 110 selects the input hand-drawn tag Tg as the representative hand-drawn tag of the new playlist.

The CPU 110 then stores into the playlist management table TB the established playlist ID in association with the hand-drawn tag ID and hand-drawn tag color information about the input hand-drawn tag Tg as well as the song ID of the user-designated song.

In this manner, the CPU 110 creates a new playlist corresponding to the hand-drawn tag Tg input by the user, and registers the user-designated song in the newly created playlist.

In the manner explained above, the portable terminal 100 creates playlists of songs based on hand-drawn tags Tg.

Figure 10:
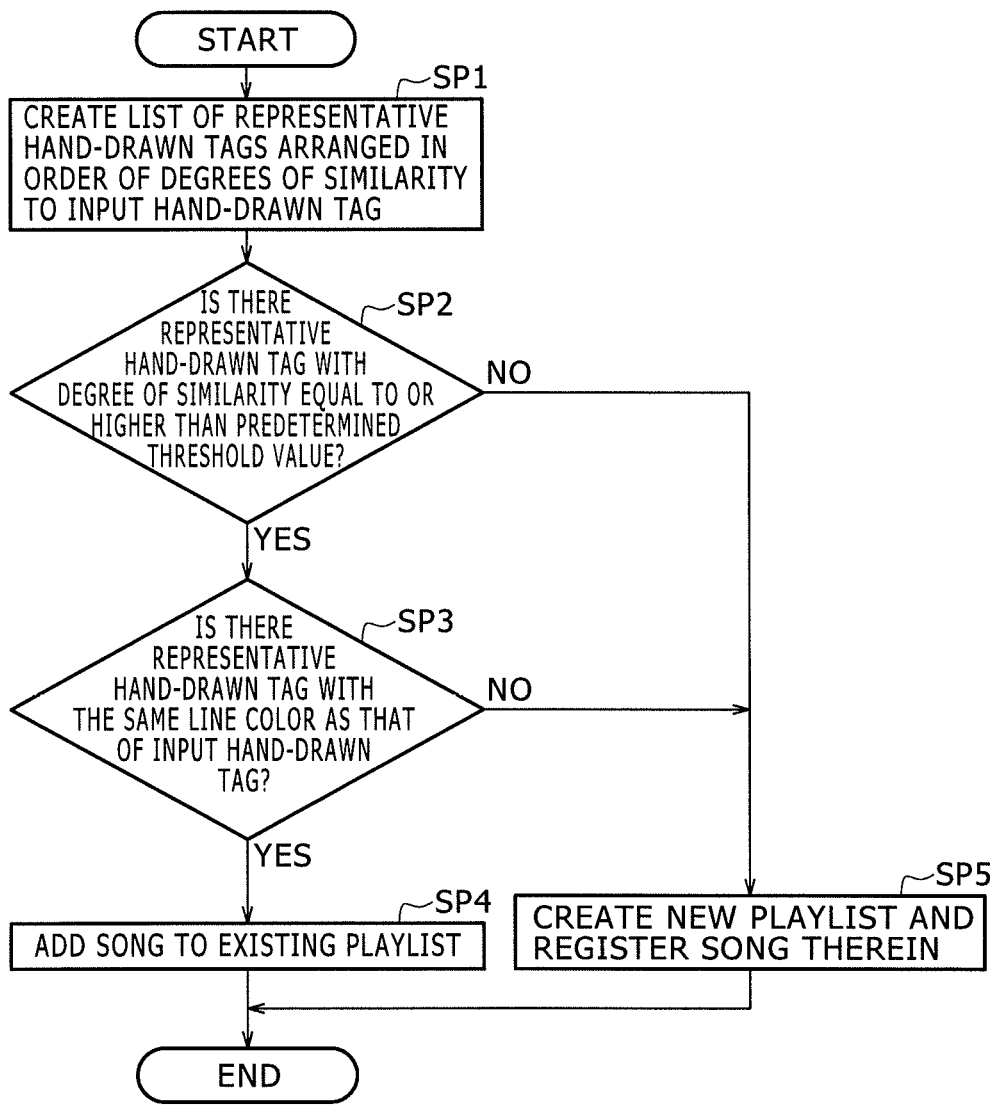
FIG. 10 is a flowchart showing a playlist creation processing routine.

Explained below by reference to the flowchart shown in FIG. 10 is a routine of processing steps for creating playlists of songs using the above-described hand-drawn tag Tg.

The playlist creation processing routine RT1 shown in FIG. 10 is made up of the steps performed by the CPU 110 of the portable terminal 100 in accordance with the music reproduction application Ap, a program stored in the nonvolatile memory 111.

Upon receipt of the input of operations for associating a song with a hand-drawn tag Tg, the CPU 110 associates the designated song with the hand-drawn tag Tg as explained above, starts the playlist creation processing routine RT1, and goes to step SP1.

In step SP1, the CPU 110 calculates the degree of similarity between the input hand-drawn tag Tg and each of the representative hand-drawn tags registered in the playlist management table TB. The CPU 110 then creates a list of the hand-drawn tag IDs of the representative hand-drawn tags in descending order of the degree of similarity, before going to the next step SP2.

In step SP2, based on the list thus created, the CPU 110 determines whether there exists any representative hand-drawn tag of which the degree of similarity to the input hand-drawn tag Tg is equal to or higher than a predetermined threshold value.

If the result of the determination in step SP2 is affirmative, that means a representative hand-drawn tag similar to the input hand-drawn tag Tg in shape is registered in the playlist management table TB.

At this point, the CPU 110 goes to step SP3 and determines whether there exists any representative hand-drawn tag of which the degree of similarity is equal to or higher than the predetermined threshold value and of which the line color is the same as that of the input hand-drawn tag Tg.

If the result of the determination in step SP3 is affirmative, that means a representative hand-drawn tag which is similar to the input hand-drawn tag Tg in shape and which has the same line color as that of the input hand-drawn tag Tg is registered in the playlist management table TB.

At this point, the CPU 110 goes to step SP4. In step SP4, of the representative hand-drawn tags with their degrees of similarity equal to or higher than the predetermined threshold value and having the same line color as that of the input hand-drawn Lag, the representative hand-drawn tag having the highest degree of similarity is determined by the CPU 110 to be similar to the input hand-drawn tag Tg.

The CPU 110 then additionally registers the user-designated song to the existing playlist corresponding to the representative hand-drawn tag determined to be similar to the input hand-drawn tag Tg, and terminates the playlist creation processing routine RT1.

On the other hand, if the result of the determination in step SP2 or SP3 is negative, that means the representative hand-drawn tag similar to the input hand-drawn tag is not registered in the playlist management table TB.

At this point, the CPU 110 goes to step SP5. In step SP5, the CPU 110 creates a new playlist corresponding to the input hand-drawn tag Tg, registers the user-designated song in that playlist, and terminates the playlist creation processing routine RT1.

[2-3-4. Display of the Playlist]

The music reproduction application Ap allows the user to verify created playlists in tabular form. Upon receipt of the input of operations for displaying playlists in tabular form, the CPU 110 causes the touch screen 102 to display a playlist table screen 220 shown in FIG. 11.

On the playlist table screen 220, the representative hand-drawn tags Pd of the playlists are displayed, for example, from the top left corner to the bottom right corner of the screen in the order in which they are registered in the playlist management table TB.

On the playlist table screen 220, the display size of each representative hand-drawn tag Pd is set on the basis of the number of songs registered in the corresponding playlist. Specifically, the larger the number of songs registered in a given playlist, the larger the display size set for the representative hand-drawn tag Pd of that playlist.

Figure 11:
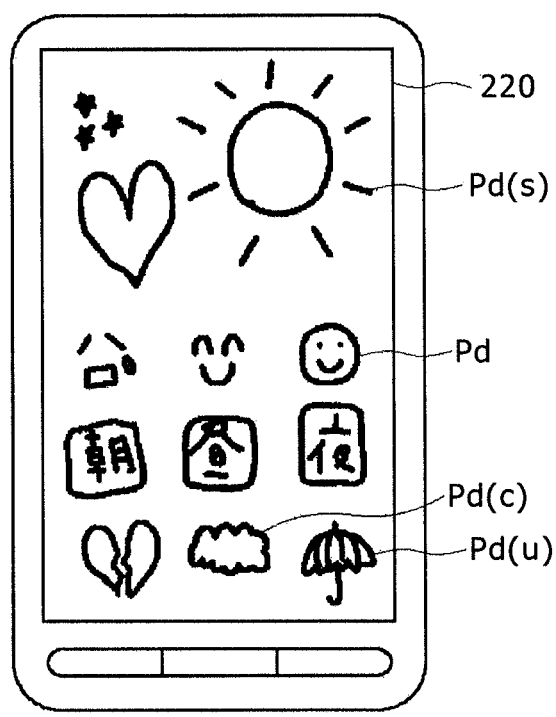
FIG. 11 is a schematic view explanatory of a playlist table screen.

In FIG. 11, for example, a representative hand-drawn tag Pd(s) as an illustration of the sun is displayed larger than a representative hand-drawn tag Pd(u) as an illustration of an umbrella. That means the playlist corresponding to the hand-drawn tag Pd(s) depicting the sun contains a larger number of songs than the playlist corresponding to the hand-drawn tag Pd(u) representing the umbrella.

As explained above, the portable terminal 100 has the display sizes of representative hand-drawn tags Pd changed based on the number of songs registered in each playlist. This enables the user to verify at a glance which playlist contains numerous registered songs.

Also on the playlist table screen 220, each of the representative hand-drawn tags Pd is displayed using an animation that is based on what is described by the tag in question.

Specifically, the nonvolatile memory 111 stores rudimentary pictures (also called the basic pictures) giving particular descriptions. As shown in FIG. 12, each basic picture is associated with an animation that suits the description of the picture in question. For example, a basic figure depicting a star is associated with the animation showing the picture to blink. A basic picture depicting a cloud is associated with the animation showing rain falling from the cloud.

The CPU 110 determines to which basic picture each representative hand-drawn tag Pd is similar, and displays the representative hand-drawn tag Pd thus determined using the animation associated with the similar basic picture. In this manner, each representative hand-drawn tag Pd is displayed using the animation that suits the description indicated by the representative tag Pd in question.

For example, when the representative hand-drawn tag Pd(s) shown in FIG. 11 as an illustration of the sun is determined to be similar to the basic figure indicative of the sun (FIG. 12), that tag is displayed in the animation showing it to blink slowly. As another example, when the representative hand-drawn tag Pd(c) shown in FIG. 11 as an illustration of the cloud is determined to be similar to the basic figure indicative of the cloud (FIG. 12), that tag is displayed in the animation showing rain falling from the cloud.

As explained above, the portable terminal 100 displays each representative hand-drawn tag Pd using the animation that suits the description indicated by the tag in question. This allows the user to enjoy viewing the playlist table screen 220 all the more.

Figure 13:
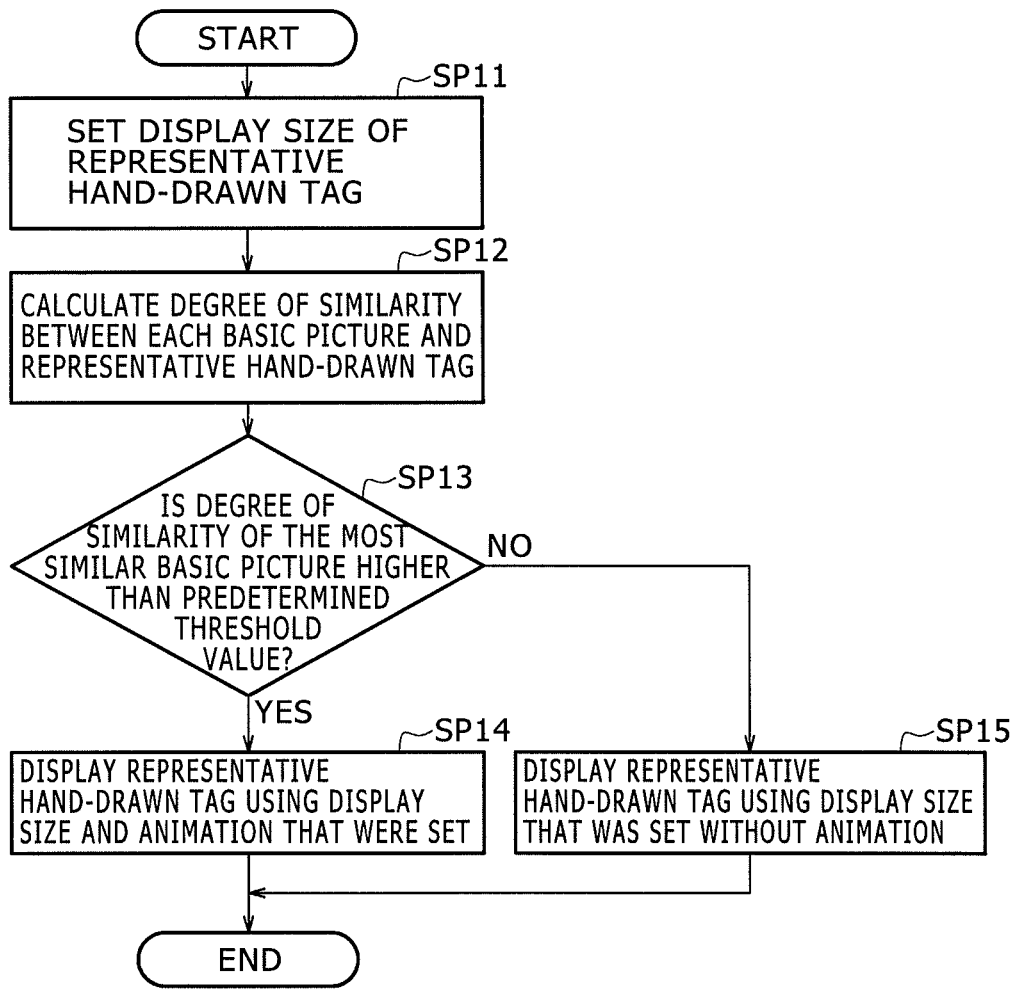
FIG. 13 is a flowchart showing a playlist display processing routine.

Explained below by reference to the flowchart of FIG. 13 is a routine of processing steps for displaying the above-described playlists in tabular form.

The playlist display processing routine RT2 shown in FIG. 13 is composed of processing steps performed by the CPU 110 of the portable terminal 100 in accordance with the music reproduction application Ap, a program stored in the nonvolatile memory 111.

It should be noted that upon receipt of the input of operations for displaying the playlist table screen 220, the CPU 110 executes the playlist display processing routine RT2 regarding each of the playlists registered in the playlist management table TB.

When starting the playlist display processing routine RT2, the CPU 110 goes to step SP11. In step SP11, the CPU 110 references the playlist management table TB to calculate the number of songs registered in the playlist. Based on the number of songs thus calculated, the CPU 110 sets the display size of the representative hand-drawn tag Pd for the playlist. After step SP11, the CPU 110 goes to step SP12.

In step SP12, using the above-described method for calculating the degree of similarity, the CPU 110 calculates the degree of similarity between the representative hand-drawn tag Pd of the playlist and each basic picture. After step SP12, the CPU 110 goes to step SP13.

In step SP13, the CPU 110 determines whether the degree of similarity of the basic picture most similar to the representative hand-drawn tag Pd is equal to or higher than a predetermined threshold value.

If the result of the determination in step SP13 is affirmative, that means the basic picture having the highest degree of similarity to the representative hand-drawn tag Pd is similar to the representative tag Pd. At this point, the CPU 110 goes to step SP14 and sets for the representative hand-drawn tag Pd the animation associated with the basic picture having the highest degree of similarity to the representative hand-drawn tag Pd.

The CPU 110 then displays the representative hand-drawn tag Pd on the playlist table screen 220 using the display size and the animation that were set, and terminates the playlist display processing routine RT2.

If the result of the determination in step SP13 is negative, that means there is no basic picture similar to the representative hand-drawn tag. At this point, the CPU 110 goes to step SP15. In step SP15, the CPU 110 displays on the playlist table screen 220 the representative hand-drawn tag Pd using the display size that is set without setting any animation, and terminates the playlist display processing routine RT2.

In the manner described above, the CPU 110 displays on the playlist table screen 220 the representative hand-drawn tag Pd of each playlist using both the display size based on the number of songs registered in the playlist of interest and the animation reflecting the description indicated by the representative hand-drawn tag Pd in question.

Figure 14:
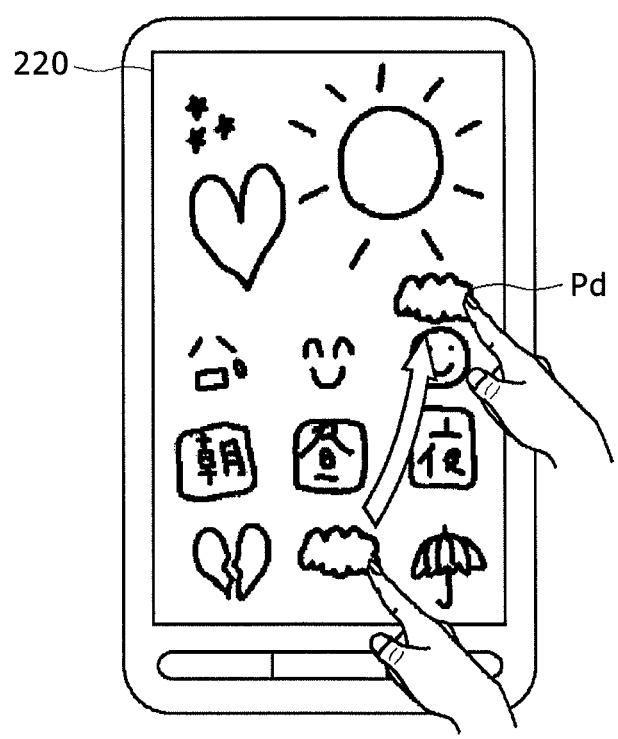
FIG. 14 is a schematic view explanatory of how to move a representative hand-drawn tag.

Suppose that as shown in FIG. 14, a drag operation is performed starting from inside a representative hand-drawn tag Pd as the starting point. In that case, the CPU 110 moves the display position of the representative hand-drawn tag Pd in a manner tracing the drag operation. When the fingertip is detached from the screen, the CPU 110 fixes the display position of the representative hand-drawn tag Pd in effect at that point in time.

In this manner, the display position of each representative hand-drawn tag Pd can be changed on the playlist table screen 220 as desired by the user.

Furthermore, when a given representative hand-drawn tag Pd is tapped on the playlist table screen 220, the CPU 110 starts reproducing the song at the top of the playlist corresponding to the tapped representative hand-drawn tag Pd. The CPU 110 proceeds to reproduce the songs successively as they are sequenced in the playlist.

Figure 15:
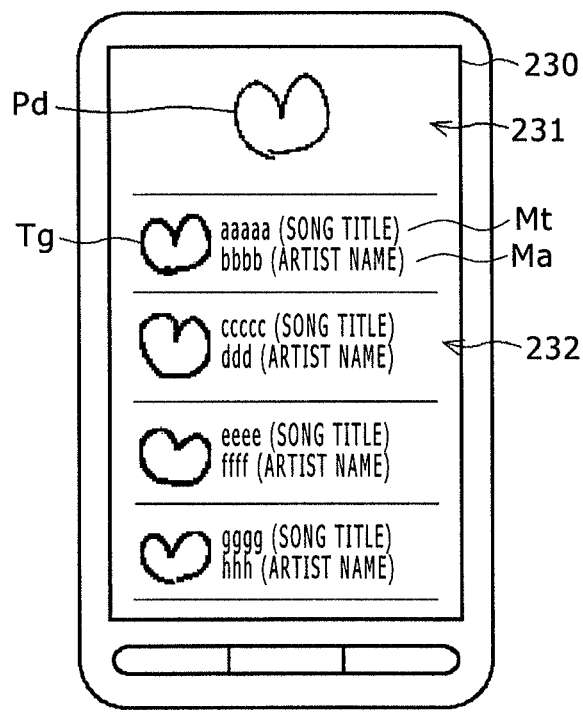
FIG. 15 is a schematic view explanatory of a playlist screen.

At the same time, the CPU 110 references the playlist management table TB to display on the touch screen 102 a playlist screen 230 shown in FIG. 15. The playlist screen 230 shows a description of the playlist corresponding to the tapped representative hand-drawn tag Pd.

The playlist screen 230 is made up of two areas: a representative hand-drawn tag display area 231 displaying the representative hand-drawn tag Pd of a given playlist, and a table display area 232 displaying a table of the songs registered in that playlist.

The table display area 232 displays in tabular form a hand-drawn tag Tg, a song title Mt, and an artist name Ma regarding each of the songs in the same order as they are to be reproduced.

As described, simply letting the user tap a representative hand-drawn tag Pd on the playlist table screen 220 causes the portable terminal 100 to reproduce songs in accordance with the corresponding playlist and to have the user verify a table of the songs registered in that playlist.

[2-3-5. Search for a Playlist]

Figure 16:
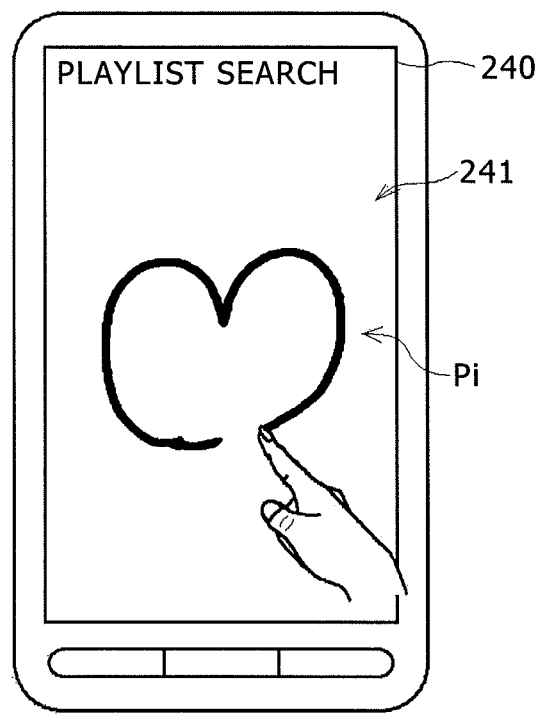
FIG. 16 is a schematic view explanatory of a search screen.

The music reproduction application Ap is further capable of searching for a created playlist. Specifically, upon receipt of the input of operations for calling up a screen for playlist search, the CPU 110 causes the touch screen 102 to display a search screen 240 shown in FIG. 16.

The search screen 240 is composed of a canvass area 241 in which lines can be drawn freely. When the user performs a drag operation, the CPU 110 displays a hand-drawn picture Pi that traces the locus of the dragging in the canvass area 241.

Later, upon receiving the input of operations for searching for a playlist, the CPU 110 sets the input hand-drawn picture Pi as the search key. Using the above-described method for calculating the degree of similarity, the CPU 110 calculates the degree of similarity between the representative hand-drawn tag Pd of each playlist on the one hand and the hand-drawn picture Pi as the search key on the other hand. Of the representative hand-drawn tags Pd, the one having the highest degree of similarity is determined by the CPU 110 to be similar to the hand-drawn picture Pi used as the search key.

As a result of the search, the CPU 110 selects the playlist corresponding to the retrieved representative hand-drawn tag Pd, starts reproducing the song at the top of the selected playlist, and proceeds to reproduce the songs successively according to that playlist. At the same time, the CPU 110 causes the touch screen 102 to display the playlist screen 230 (FIG. 15) giving a description of the playlist in question.

Consequently, the user is allowed to listen to the songs of the playlist corresponding to the representative hand-drawn tag Pd similar to the user-input hand-drawn picture Pi, while verifying the description of the playlist in question.

As described, when the user inputs a hand-drawn picture Pi through the search screen 240 as the search key, the CPU 110 searches for the playlist in which are registered the songs having the hand-drawn tag Tg similar to the input hand-drawn picture Pi.

Because simply letting the user input the hand-drawn picture Pi can initiate a search for the desired playlist, it is possible to retrieve the desired playlist appreciably more quickly than if the playlist table screen 220 is displayed for viewing by the user who is then prompted to select the appropriate playlist therefrom.

[2-3-6. Sharing of Playlists]

The music reproduction application Ap is also capable of sharing the playlists created by the portable terminal 100 with an external device. Upon receipt of the input of operations for sharing a playlist with the external device, the CPU 110 creates a shared file for sharing playlists in XML (Extensible Markup Language).

Figure 17:
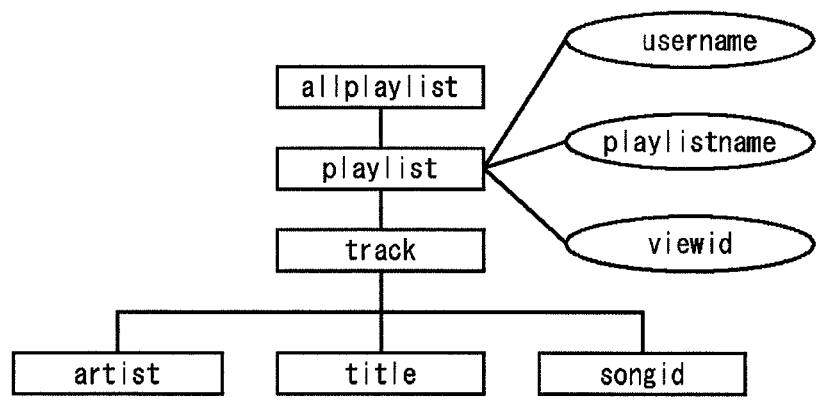
FIG. 17 is a schematic view explanatory of an XML structure of a shared file.

As shown in FIG. 17, the shared file has a hierarchical structure in which all playlists are defined as "allplaylist." Under the definition "allplaylist," each playlist is defined as "playlist" under which is subsumed each song defined as "track."

Also in the shared file, the definition "playlist" representing each playlist is associated with a definition "username" indicating the name of the user who created the playlist in question, a definition "playlistname" indicating the name of the playlist, and a definition "viewid" indicating the order in which the playlist is displayed in tabular form.

Further in the shared file, the definition "track" representing each song is associated with a definition "artist" indicating the name of the artist related to the song in question, a definition "title" indicating the title of the song, and a definition "songid" identifying the corresponding music file.

The CPU 110 then transmits the shared file thus created to the connected external device via the external connection interface 113 or network interface 114.

After receiving the shared file thus transmitted, The external device can reproduce songs from playlists based on the shared file.

[2-4. Operations and Effects]

Structured as explained above, the portable terminal 100 has the picture Pi hand-drawn and input by the user through the touch screen 102 and associates the user-designated song with the input picture as the hand-drawn tag Tg.

In this manner, the user can get his or her feeling (i.e., image) for a given song reflected as desired in the hand-drawn tag Tg of that song. For example, the user may express unexplainable feelings in the form of hand-drawn pictures for use as hand-drawn tags Tg of songs.

The feature above further allows the user to input hand-drawn tags Tg significantly more quickly than if texts are input through a keyboard or the like as tags of songs.

Also, the feature above eliminates the need for the user to input hand-drawn tags Tg using an external device. The portable terminal 100 alone may be used to input hand-drawn tags Tg for songs.

Also, the portable terminal 100 determines whether hand-drawn tags Tg are similar to each other based on the degree of similarity therebetween, so that the songs determined to have mutually similar hand-drawn tags Tg are registered in the same playlist upon playlist creation.

It is thus possible automatically to create playlists that suit the user's feelings (images) reflected in hand-drawn tags Tg. For example, a playlist can be created which contains the songs for which the user's feelings (images) are similar to one another.

Ordinarily, where playlists are created using texts as tags and where some songs are desired to be registered in the same playlist, it is necessary to make the corresponding texts coincide with one another upon text input. It is thus necessary for the user to memorize the texts that have been associated with songs as their tags.

By contrast, the portable terminal 100 allows the songs with their hand-drawn tags Tg similar to each other to be registered in the same playlist. Without memorizing the hand-drawn tags Tg for all other songs, the user need only input a hand-drawn tag Tg depicting the image of a desired song. The songs that evoke similar images in the user's mind can then be registered in the same playlist.

Also, the portable terminal 100 selects one of the hand-drawn tags Tg associated with the songs registered in each playlist as a representative hand-drawn tag Tg, and displays the hand-drawn tags Tg of the playlists on the touch screen 102 in tabular form.

The user is then allowed to verify at a glance the playlists containing the songs associated with the hand-drawn tags Tg as displayed. The user can recognize all the more intuitively the playlists containing the songs evoking particular images than if the playlists are displayed using texts in tabular form. This makes it easy for the user to select a specific playlist desired to be listened to depending on how the user feels at the moment.

Structured as described above, the portable terminal 100 allows a picture that is hand-drawn and input by the user to be associated with a given song as its hand-drawn tag Tg, so that the user can freely express the particular image and have it set as the hand-drawn tag Tg of the song. By calculating the degrees of similarity between hand-drawn tags Tg for playlist creation, the portable terminal 100 can create a playlists made up of the songs with their user-expressed images found similar to one another. The portable terminal 100 thus permits creation of playlists based on the tags expressed as desired by individual users. Consequently, the playlists may be created in such a manner as to satisfy the individual users' desires.

3. Variations

[3-1. First Variation]

With the above-described embodiment, when a drag operation is performed starting from inside a given representative hand-drawn tag Pd as the starting point on the playlist table screen 220, the CPU 110 moves the display position of that representative hand-drawn tag Pd in keeping with the drag operation.

Alternatively, when a drag operation is performed starting from outside representative hand-drawn tags Pd as the starting point on the playlist table screen 220, the CPU 110 may perform processes for combining the playlists corresponding to the representative hand-drawn tags Pd encircled by the locus of the drag operation.

Figure 18:
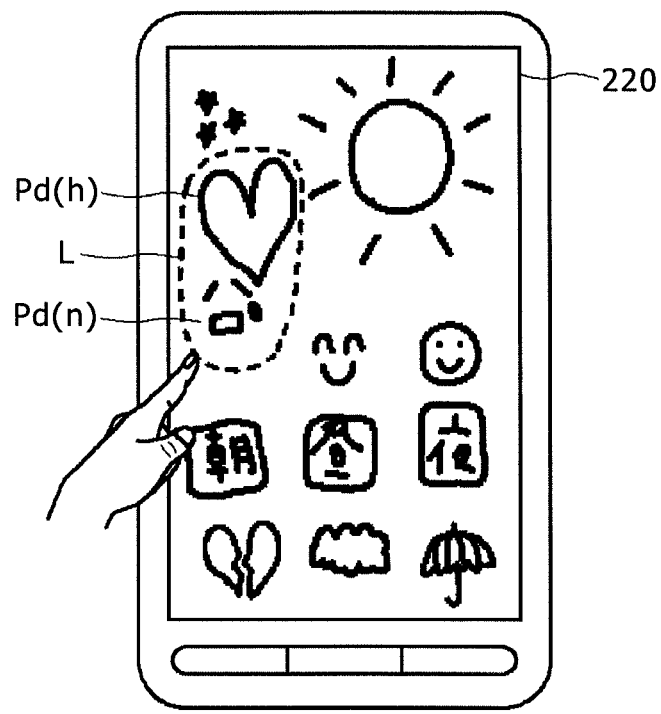
FIG. 18 is a schematic view explanatory of how to combine playlists.

Specifically, when a drag operation is carried out starting from outside representative hand-drawn tags Pd as the starting point on the playlist table screen 220, the CPU 110 draws the locus of the drag in a dotted line L as shown in FIG. 18.

When a plurality of representative hand-drawn tags Pd are encircled by the dotted line L as a result of the drag, the CPU 110 recognizes the encircled plurality of representative hand-drawn Lays Pd to have been designated by the user.

The CPU 110 then creates a new playlist that combines the multiple playlists corresponding to the plurality of representative hand-drawn tags Pd designated by the user.

Here, combining a plurality of playlists signifies that all sings registered in each of the playlists are registered to the newly created playlist.

In the example shown in FIG. 18, a representative hand-drawn tag Pd(h) as an illustration of the heart and a representative hand-drawn tag Pd(n) as an illustration of a sad face are encircled by the dotted line L. In this case, the CPU 110 registers the songs contained in the playlists corresponding to the representative hand-drawn tags Pd(h) and Pd(n) into the newly created single playlist.

Explained below is a method for managing playlists each created by combining a plurality of playlists. In addition to the hand-drawn tag ID, hand-drawn tag color information, song IDs, and playlist ID of a given playlist, the playlist management table TB may store combination information identifying a playlist or playlists combined with the playlist of interest. The playlist ID of each playlist being combined may be stored as the combination information.

For example, the CPU 110 stores into the playlist management table TB the combination information that associates the playlist ID of the playlist corresponding to the representative hand-drawn tag Pd(h) depicting the heart with the playlist ID of the playlist corresponding to the representative hand-drawn tag Pd(n) representing the sad face.

Also, the CPU 110 stores into the playlist management table TB the combination information that associates the playlist ID of the playlist corresponding to the representative hand-drawn tag Pd(n) depicting the sad face with the playlist ID of the playlist corresponding to the representative hand-drawn tag Pd(h) representing the heart.

In the manner described above, the CPU 110 creates a single playlist combining a plurality of playlists.

Thereafter, when displaying representative hand-drawn tags Pd on the playlist table screen 220, the CPU 110 references the playlist management table TB to verify whether the playlist ID of the playlist corresponding to each representative hand-drawn tag Pd is associated with combination information.

If combination information is found associated with the playlist ID of the playlist corresponding to any representative hand-drawn tag Pd, the CPU 110 recognizes that that playlist is combined with the playlist or playlists indicated by the combination information in question.

The CPU 110 then displays the representative hand-drawn tags Pd corresponding to the combined playlists close to one another on the screen, and shows these tags encircled by the dotted line L.

The display above allows the user to verify that the playlists corresponding to the representative hand-drawn tags Pd encircled by the dotted line L are combined as a single playlist.

If the user taps the representative hand-drawn tags Pd encircled by the dotted line L at this point, the CPU 110 successively reproduces the songs registered in the combined playlists. In such a case, the CPU 110 may reproduce songs alternately from two playlists, for example.

As described, by simply letting the user encircle representative hand-drawn tags Pd by the locus of a drag operation, the portable terminal 100 can create a new playlist combining a plurality of playlists.

[3-2. Second Variation]

With the above-described embodiment, when created playlists are to be shared with an external device, only the shared file is transmitted to that external device.

Alternatively, the CPU 110 may transmit the hand-drawn tags Tg along with the shared file to the external device connected via the external connection interface 113 or network interface 114.

In this case, the CPU 110 may associate the definition "playlist" indicating each playlist with not only the information discussed above in conjunction with the embodiment but also information identifying the representative hand-drawn tags Pd of the playlists in the shared file.

Also, the CPU 110 may associate the definition "track" denoting each song with not only the information discussed above in conjunction with the embodiment but also information identifying the hand-drawn tags Tg of the songs in the shared file.

In this manner, the external device having received the shared file and hand-drawn tags Tg can cause its display portion to display the above-described playlist table screen 220 and playlist screen 230 based on the shared file and hand-drawn tags Tg received.

As another alternative, the CPU 110 may transmit along with the shared file only the hand-drawn tags Tg as the representative hand-drawn tags Pd of the playlists to the external device connected via the external connection interface 113 or network interface 114.

This also allows the external device having received the shared file and representative hand-drawn tags Pd to have its display portion display the above-described playlist table screen 220 based on the shared file and representative hand-drawn tags Pd received.

[3-3. Third Variation]

The above-described embodiment was shown to use the strokes making up a hand-drawn tag Tg as the method for calculating the degree of similarity regarding each hand-drawn tag Tg.

Alternatively, any one of many other schemes may be adopted as the method for calculating the degree of similarity of each hand-drawn tag Tg. For example, the coordinates of the hand-drawn tag Tg on the screen may be utilized.

Figure 19A:
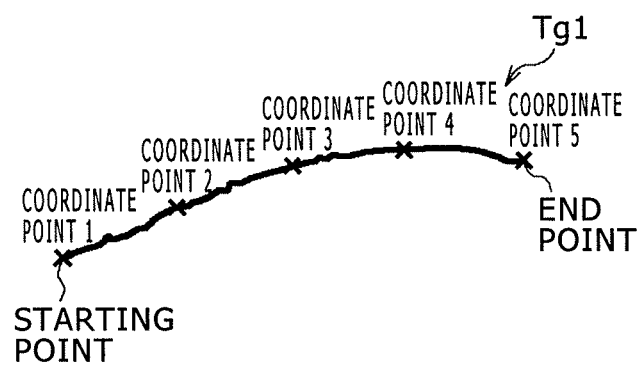
FIGS. 19A and 19B are schematic views explanatory of how to calculate degrees of similarity with variations of the embodiment.
Figure 19B:
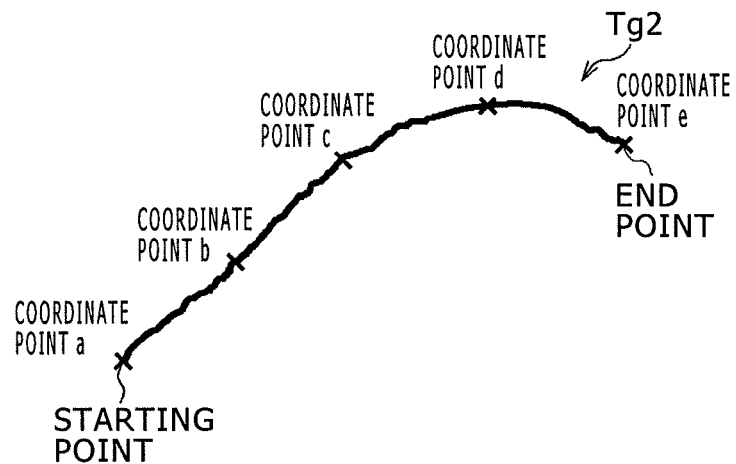

Using that alternative method, suppose that the degree of similarity is calculated between a hand-drawn tag Tg1 shown in FIG. 19A and a hand-drawn tag Tg2 in FIG. 19B. In this case, coordinate points of the touched position are detected from the starting point taken as the origin up to the end point along each of the hand-drawn tags Tg1 and Tg2. That is, in FIG. 19A, coordinate points 2 through 5 of the touched position are detected along the hand-drawn tag Tg1 relative to its starting point (coordinate point 1) taken as the origin. In FIG. 19B, coordinate points b through e of the touched position are detected along the hand-drawn tag Tg2 relative to its starting point (coordinate point a) taken as the origin.

The coordinate points of the touched position detected from the hand-drawn tags Tg1 and Tg2 are then compared so as to calculate the degree of similarity between the two tags. In the example of FIGS. 19A and 19B, the coordinate points 2 through 5 of the touched position along the hand-drawn tag Tg1 are compared with the coordinate points b through e of the touched position along the hand-drawn tag Tg2.

[3-4. Fourth Variation]

With the above-described embodiment, during display of the representative hand-drawn tags Pd on the playlist table screen 220, the animation suitable for the description of each representative hand-drawn tag Pd was shown set for the representative tag Pd in question.

Alternatively, when a representative hand-drawn tag Pd is to be set for a playlist, a corresponding animation may be set for that representative hand-drawn tag Pd at the same time.

In this case, after setting the representative hand-drawn tag Pd for the playlist, the CPU 110 selects the above-described animation corresponding to the basic picture similar to that representative hand-drawn tag Pd as the animation to be displayed when the representative tag Pd in question is displayed.

The CPU 110 then sets the animation for the representative hand-drawn tag Pd by storing the animation ID identifying the selected animation into the playlist management table TB in association with the hand-drawn tag ID of the representative hand-drawn tag Pd in question.

When getting the playlist table screen 220 to display the representative hand-drawn tags Pd, the CPU 110 recognizes the animation set for each representative hand-drawn tag Pd by referencing the playlist management table TB.

[3-5. Fifth Variation]

Also with the above-described embodiment, the CPU 110 was shown selecting the hand-drawn tag Tg of the first song registered in a given playlist as the representative hand-drawn tag Pd of that playlist.

Alternatively, the CPU 110 may select any one of the hand-drawn tags Tg associated with the songs registered in a given playlist as the representative hand-drawn tag Pd of that playlist. For example, the CPU 110 may select the most-recently hand-drawn tag Tg as the representative hand-drawn tag Pd.

[3-6. Sixth Variation]

Also with the above-described embodiment, the CPU 110 was shown associating the picture that was hand-drawn and input through the touch screen 102 with a given song.

Alternatively, the CPU 110 may receive a hand-drawn picture input from an external device connected via the external connection interface 113 or network interface 114 and associate the received picture with a given song as its hand-drawn tag Tg. The input hand-drawn picture is a picture drawn by the user making use of an information processing apparatus.

[3-7. Seventh Variation]

Also with the above-described embodiment, the CPU 110 was shown changing the display size of representative hand-drawn tags Pd based on the number of songs registered in each playlist.

Alternatively, the CPU 110 may change the display size of representative hand-drawn tag Pd based on other diverse related information. For example, the larger the number of times a given playlist is reproduced, the larger the display size that may be set by the CPU 110 for the representative hand-drawn tag Pd of that playlist.

Also with the above-described embodiment, the CPU 110 was shown displaying each representative hand-drawn tag Pd using the animation based on the description indicated by the representative hand-drawn tag Pd in question.

Alternatively, the CPU 110 may display each representative hand-drawn tag Pd using an animation based on other related information. For example, the CPU 110 may display the representative hand-drawn tags Pd of highly liked playlists using an animation that causes the tags in question to blink.

As described, based on the related information about each playlist, the CPU 110 may set the manner in which each representative hand-drawn tag Pd is displayed (i.e., in terms of display size, animation, etc.) on the playlist table screen 220.

As another alternative, the CPU 110 may display all representative hand-drawn tags Pd in the same manner.

As a further alternative, the CPU 110 may set the manner in which to display representative hand-drawn tags Ps based on the related information about each playlist not only on the playlist table screen 220 but also on the playlist screen 230 and other screens on which the representative hand-drawn tags Pd are displayed.

As an even further alternative, the CPU 110 may set the manner in which to display hand-drawn tags Tg based on the related information about each song (e.g., the number of times each song has been reproduced, how much each song is liked, etc.)

[3-8. Eighth Variation]

Also with the above-described embodiment, the CPU 110 was shown receiving the input of a hand-drawn picture Pi while displaying related information about a given song, and associating the currently displayed song with the related information about that song using the input hand-drawn picture Pi as the hand-drawn tag Tg.

Alternatively, the CPU 110 may, while reproducing a given song, receive the input of a hand-drawn picture Pi without displaying the related information about that song. Then the CPU 110 may associate the currently reproduced song with the input hand-drawn picture Pi as a hand-drawn tag Tg.

[3-9. Ninth Variation]

Also with the above-described embodiment, the CPU 110 was shown associating each user-designated song with a picture that was hand-drawn and input by the user as a hand-drawn tag Tg, and creating a playlist of songs based on such hand-drawn tags Tg.

Alternatively, the CPU 110 may associate various other contents (e.g., still pictures, moving pictures, etc.) with hand-drawn tags Tg and create a playlist of such contents based on the hand-drawn tags Tg.

[3-10. Tenth Variation]

Also with the above-described embodiment, the present disclosure was shown applied to the portable terminal 100 having the touch screen 102 as the operation device.

Alternatively, the present disclosure may be applied to information processing apparatuses that have various other operation devices.

On the information processing apparatus having an operation device other than the touch screen 102, the operation device may be furnished separately from a display device, or may be connected to an external display device.

[3-11. Eleventh Variation]

Also with the above-described embodiment, the portable terminal 100 was shown furnished with the touch screen 102 made up of the LCD panel 102A and capacitance type touch panel 102B.

Alternatively, the portable terminal 100 may be provided with an LCD that incorporates the touch panel capability replacing the touch screen 102.

Furthermore, the LCD panel 102A may be replaced by any one of various other displays such as an EL (electroluminescence) display.

[3-12. Twelfth Variation]

Also with the above-described embodiment, the portable terminal 100 acting as the information processing apparatus was shown to include the CPU 110 as the control portion, the touch screen 102 as the display portion and operation portion, and the external connection interface 113 and network interface 114 as the communication portion.

Alternatively, the above-mentioned functional portions of the portable terminal 100 (control portion, display portion, operation portion, and communication portion) may be replaced by various other pieces of hardware provided they have equivalent functions.

With the above-described embodiment, the present disclosure was shown applied to the portable terminal 100. Alternatively, this disclosure may be applied to various other information processing apparatuses.

[3-13. Thirteenth Variation]

Also with the above-described embodiment, the programs for executing diverse processes were shown written to the nonvolatile memory 111 of the portable terminal 100.

Alternatively, the portable terminal 100 may be furnished with a slot for accommodating a storage medium such as a memory card. The CPU 110 may retrieve suitable programs from the storage medium inserted into the slot. The CPU 110 may further install the programs retrieved from the storage medium into the nonvolatile memory 111. Furthermore, the CPU 110 may download the programs from devices on a network via the network interface 114 and install the downloaded programs into the nonvolatile memory 111.

[3-14. Fourteenth Variation]

Furthermore, the present disclosure is not limited to the embodiment and its variations discussed above. That is, the disclosure may be applied to any combination of part or all of the embodiment and its variations, or to a modification or modifications extracted partially therefrom.

The present disclosure can thus be applied extensively to information processing apparatuses such as content reproduction devices.

The present application contains subject matter related to that disclosed in Japanese Priority Patent Application JP 2011-075999 filed in the Japan Patent Office on Mar. 30, 2011, the entire content of which is hereby incorporated by reference.

What is claimed is:

1. An information processing apparatus, comprising:
   a processor configured to:
      receive an input of a plurality of pictures to be associated as a tag with one or more of a plurality of content to be played, wherein each of the plurality of pictures is hand-drawn;
      create a plurality of playlists of the plurality of content to be played based on a first degree of similarity between pictures associated with respective content of the plurality of content as tags thereof;
      select, as a representative tag for each of the plurality of playlists, a corresponding tag of a first song registered in a corresponding playlist of the plurality of playlists;
      display, for each playlist of the plurality of playlists, a picture among the plurality of pictures corresponding to the representative tag selected for that particular playlist so as to display a table of pictures representing the plurality of playlists; and
      create, based on encirclement by a user of a first plurality of pictures from the plurality of pictures by a drag operation, a new playlist by a first combination of playlists that correspond to the encircled first plurality of pictures, wherein the first combination of playlists is identified based on at least one of a tag ID, a tag color information, a song ID or a playlist ID of each of the playlists included in the first combination.

2. The information processing apparatus according to claim 1, wherein the processor is further configured to determine whether the plurality of pictures associated with respective content of the plurality of content are similar based on the first degree of similarity therebetween so as to register the plurality of content in a same playlist.

3. The information processing apparatus according to claim 1, wherein the processor is further configured to set a display mode for the picture of the representative tag for each of the plurality of playlists based on information about a corresponding playlist of interest.

4. The information processing apparatus according to claim 3, wherein, based on a number of songs registered in each of the plurality of playlists, the processor is further configured to set a display size for the picture of the representative tag.

5. The information processing apparatus according to claim 4, wherein the processor is further configured to display the picture of the representative tag for each of the plurality of playlists by use of an animation based on a description for the corresponding playlist of interest.

6. The information processing apparatus according to claim 1, wherein, based on a designation by the user of a second plurality of pictures from the table of pictures displayed, the processor is further configured to create a second playlist by a second combination of playlists corresponding to the designated second plurality of pictures.

7. The information processing apparatus according to claim 1, wherein, based on a first content of the plurality of content being reproduced by the processor, the processor is further configured to receive a hand-drawn input of a first picture via a touch panel, and associate the hand-drawn input of the first picture as a first tag with the first content of the plurality of content.

8. The information processing apparatus according to claim 1, wherein, based on display of related information by the processor about a third content of the plurality of content to be played, the processor is further configured to receive a hand-drawn input of a third picture via a touchy panel, and associate the hand-drawn input of the third picture as a third tag with the third content.

9. The information processing apparatus according to claim 1, wherein the processor is further configured to transmit, to an external apparatus via a communication interface, one or more of the created plurality of playlists together with respective pictures associated as the representative tag with the one or more of the plurality of content.

10. The information processing apparatus according to claim 1, wherein, based on a determination that the picture of the plurality of pictures is hand-drawn and input by the user as a search key, the processor is further configured to search for a picture similar to the picture input as the search key based on a second degree of similarity between the picture input as the search key and respective pictures associated with the plurality of content, so as to select one or more of the plurality of playlists.

11. A playlist creation method, comprising:
   receiving an input of a plurality of pictures to be associated as a tag with one or more of a plurality of content to be played, wherein each of the plurality of pictures is hand-drawn;
   creating a plurality of playlists of the plurality of content to be played based on a degree of similarity between pictures associated with respective content of the plurality of content as tags thereof;
   selecting, as a representative tag for each of the plurality of playlists, a corresponding tag of a first song registered in a corresponding playlist of the plurality of playlists;
   displaying, for each playlist of the plurality of playlists, a picture among the plurality of pictures corresponding to the representative tag selected for that particular playlist so as to display a table of pictures representing the plurality of playlists; and creating, based on encircling by a user of a first plurality of pictures from the plurality of pictures by a drag operation, a new playlist by a combination of playlists that correspond to the encircled first plurality of pictures, wherein the combination of playlists is identified based on at least one of a tag ID, a tag color information, a song ID or a playlist ID of each of the playlists included in the combination.

12. A non-transitory computer-readable medium having stored thereon, computer-executable instructions for causing a computer to execute operations, the operations comprising:

receiving an input of plurality of pictures to be associated as a tag with one or more of a plurality of content to be played, wherein each of the plurality of pictures is hand-drawn;

creating a plurality of playlists of the plurality of content to be played based on a degree of similarity between pictures associated with respective content of the plurality of content as tags thereof;

selecting, as a representative tag for each of the plurality of playlists, a corresponding tag of a first song registered in a corresponding playlist of the plurality of playlists;

displaying, for each playlist of the plurality of playlists, a picture among the plurality of pictures corresponding to the representative tag selected for that particular playlist so as to display a table of pictures representing the plurality of playlists; and creating, based on encircling by a user of a first plurality of pictures from the plurality of pictures by a drag operation, a new playlist by a combination of playlists that correspond to the encircled first plurality of pictures, wherein the combination of playlists is identified based on at least one of a tag ID, a tag color information, a song ID or a playlist ID of each of the playlists included in the combination.

13. The information processing apparatus according to claim 1, wherein, based on a number of times each of the plurality of playlists is reproduced, the processor is further configured to set a display size for a picture of the representative tag of each of the plurality of playlists.

14. The information processing apparatus according to claim 1, wherein the processor is further configured to register additional content into one or more of the plurality of playlists based on coordinate points of touched positions of an additional tag of the additional content and of the representative tag of the one or more of the plurality of playlists.

* * * * *